(12) United States Patent
Chen

(10) Patent No.: US 7,520,605 B1
(45) Date of Patent: Apr. 21, 2009

(54) EYEWEAR WITH MAGNETIC CONNECTION BETWEEN LENSES AND FRAME

(76) Inventor: Chih-Ming Chen, No. 19, Alley 4, Lane 234, Sec. 5, Her Mei Road, Tainan City (TW)

( * ) Notice: Subject to any disclaimer, the term of this patent is extended or adjusted under 35 U.S.C. 154(b) by 0 days.

(21) Appl. No.: 12/073,742

(22) Filed: Mar. 10, 2008

(51) Int. Cl.
*G02C 1/08* (2006.01)
(52) U.S. Cl. .......................... 351/106; 351/41; 351/103; 351/124
(58) Field of Classification Search .................. 351/41, 351/44, 103–109, 124, 140
See application file for complete search history.

(56) References Cited

U.S. PATENT DOCUMENTS

2007/0132938 A1* 6/2007 Huang ......................... 351/41
2008/0143951 A1* 6/2008 Won .............................. 351/57

* cited by examiner

*Primary Examiner*—Huy K Mai
(74) *Attorney, Agent, or Firm*—Rosenberg, Klein & Lee

(57) ABSTRACT

Eyewear includes two ends portion and a frame having a bridge. The bridge has two outer sides each including a groove extending inward and having at least one face section that is magnetically attracting or magnetically attracted. Each lens portions includes a lens and a protrusion formed on an inner end of the lens and received in the groove of one of the outer sides. A magnetically attracted or attracting element is mounted on at least one face of the protrusion of each lens portion and has magnetic attraction with the at least one face section of the groove of one of the outer sides. The walls of the grooves reliably catch and support the protrusions such that the lens portions are coupled with the frame at more than one point. A reliable coupling effect is provided by three-dimensional coupling and magnetic attraction between the coupling portions and the frame.

5 Claims, 6 Drawing Sheets

EYEWEAR WITH MAGNETIC CONNECTION BETWEEN LENSES AND FRAME

BACKGROUND OF THE INVENTION

The present invention relates to eyewear with magnetic connection between two lenses and a frame thereof and, more particularly, to eyewear including a frame and two lenses that are connected to the frame by magnetic force.

Conventionally, a pair of glasses includes a frame having two ring portions each having a groove and two lenses each having a peripheral edge forcibly inserted into the groove of one of the ring portions. Since each lens is slightly larger than the groove, the lenses must be forcibly inserted into the grooves while utilizing material resiliency. However, the assembly is not easy, and the lenses are liable to break during forcible insertion. Furthermore, change for appropriate lenses by users is difficult. Namely, the lenses are of a fixed type and, thus, monotonous.

U.S. Patent Publication No. 2005/0206835 A1 discloses a spectacle assembly including a spectacle frame and a pair of auxiliary eyeglasses releasably attachable with the spectacle frame without conventional extra attaching accessories to provide a neat appearance. However, the coupling force at the bridge portion of the spectacle frame is insufficient to retain the auxiliary eyeglasses in place. U.S. Patent Publication No. 2005/0264754 A1 discloses a convertible eyewear including a removable shield removably secured by magnetic force to a frame by the interaction of at least one magnetic rivet recessed within the frame and at least one magnetic rivet that protrudes from the shield. However, the magnetic force at the bridge portion of the spectacle frame is insufficient to retain the shield in place. U.S. Pat. No. 6,253,388 B1 discloses eyewear including a pair of lenses and a pair of magnets coupled to respective inner ends of the lenses. The magnets are securely connectable together and releasable from each other. However, the magnetic force between the magnets is insufficient to maintain a fixed positional relationship between the lenses. Eyewear of other types having lenses attached to the bridge portion and other portions of the frame by magnetic force have been proposed to provide more than two contact points between each lens and the frame. However, the resultant eyewear is not economical, for more magnets are utilized.

BRIEF SUMMARY OF THE INVENTION

Eyewear according to the preferred teachings of the present invention includes a frame having a bridge with two outer sides. Each outer side has a groove extending inward. The groove of each outer side has at least one face section that is magnetically attracting or magnetically attracted. Eyewear further includes two lens portions each having a lens and a protrusion formed on an inner end of the lens. The protrusion of each lens portion is received in the groove of one of the outer sides. A magnetically attracted or attracting element is mounted on at least one face of the protrusion of each lens portion and has magnetic attraction with the at least one face section of the groove of one of the outer sides. The walls of the grooves reliably catch and support the protrusions such that the lens portions are coupled with the frame at more than one point. A reliable coupling effect is provided by three-dimensional coupling and magnetic attraction between the coupling portions and the frame.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
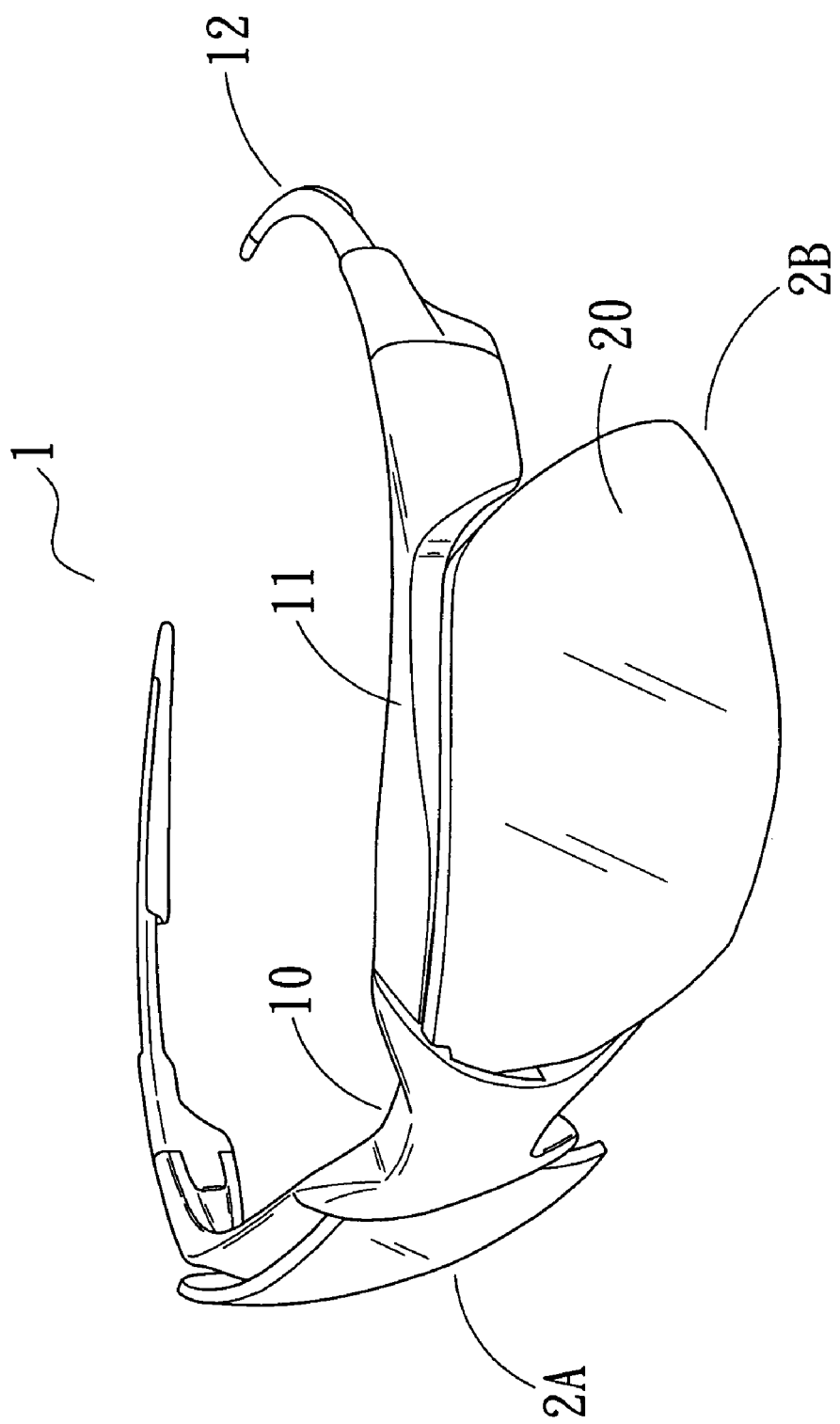
FIG. 1 shows an exploded perspective view of eyewear of an embodiment according to the preferred teachings of the present invention.
Figure 2:
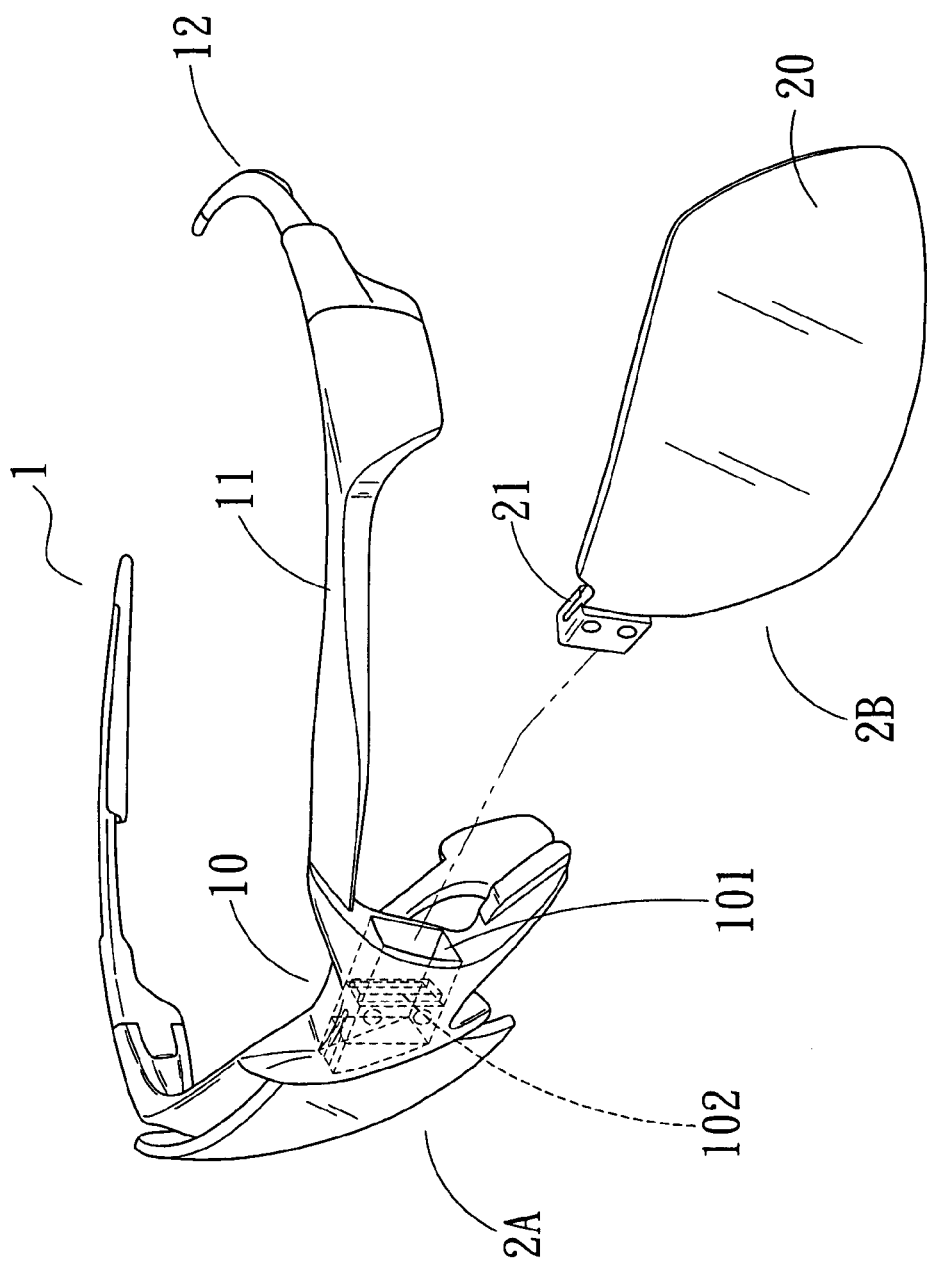
FIG. 2 shows a partially exploded perspective view of the eyewear of FIG. 1.
Figure 3:
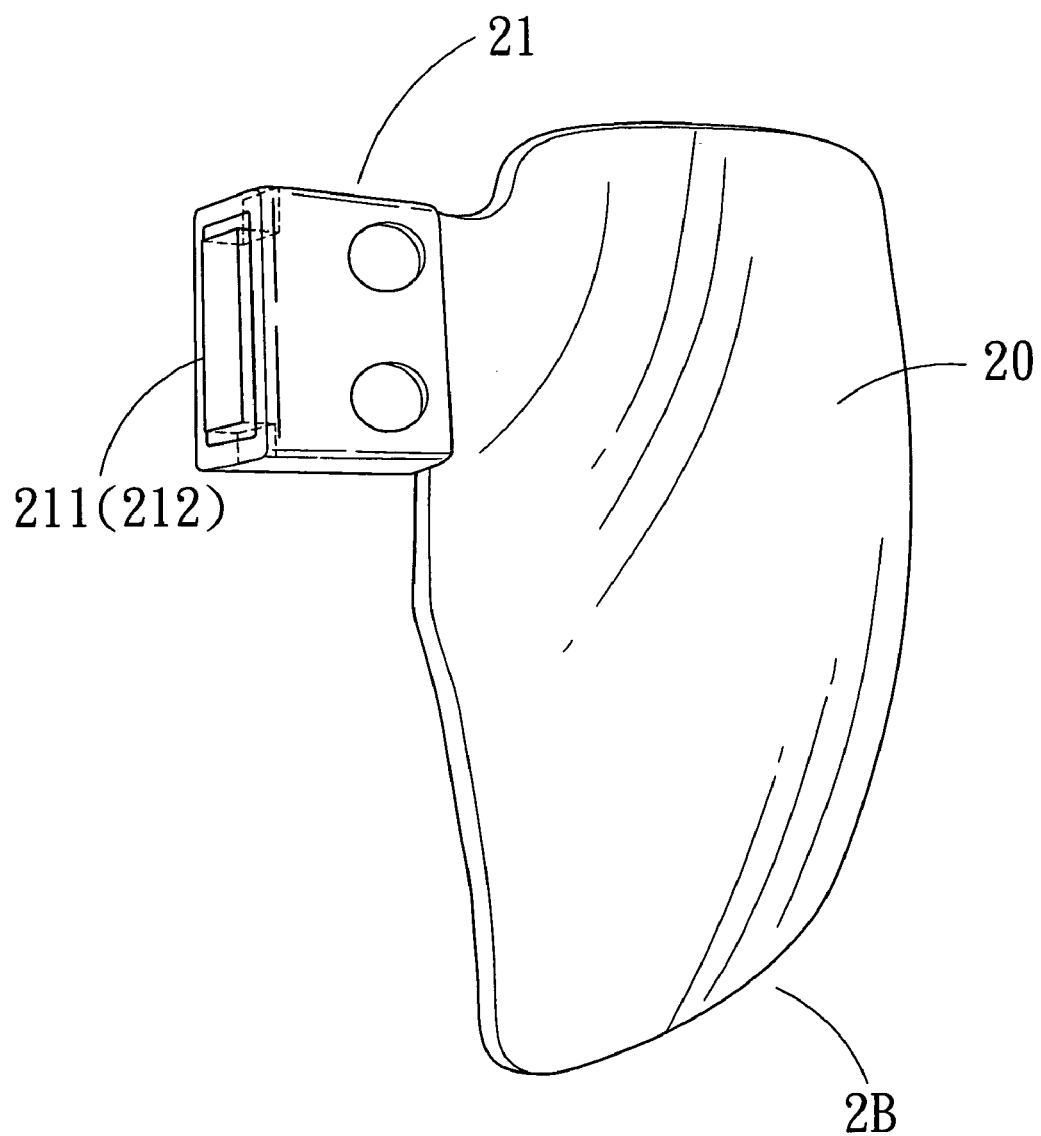
FIG. 3 shows a perspective view of a lens of the eyewear of FIG. 1.

With reference to FIGS. 1 to 3, eyewear of an embodiment according to the preferred teachings of the present invention includes a frame 1 and two lens portions 2A and 2B. The frame 1 includes a bridge 10 at a center thereof. Two horizontal rods 11 respectively extend from two sides of the bridge 10 and form a body of the frame 1. Each rod 11 is coupled with a temple 12. The bridge 10 includes two outer sides each having a groove 101 extending inward. Each groove 101 includes at least one face section that is magnetically attracting or magnetically attracted. Specifically, in an example, a magnetically attracting element (i.e., a magnet) 102 is mounted in each groove 101 to provide a magnetically attracting face section. In another example, a magnetically attracted element is mounted in each groove 101 to provide a magnetically attracted face section. In an embodiment shown in FIG. 4, the two grooves 101 in the outer sides of the bridge 10 are separated by a partitioning wall 13 having two opposite sides each of which faces outward and forms an end face of one of the grooves 101 on which a magnetically attracting or magnetically attracted element 102 is mounted. Alternatively, the partitioning wall 13 can be a magnet having two opposite magnetically attracting faces.

Figure 5:
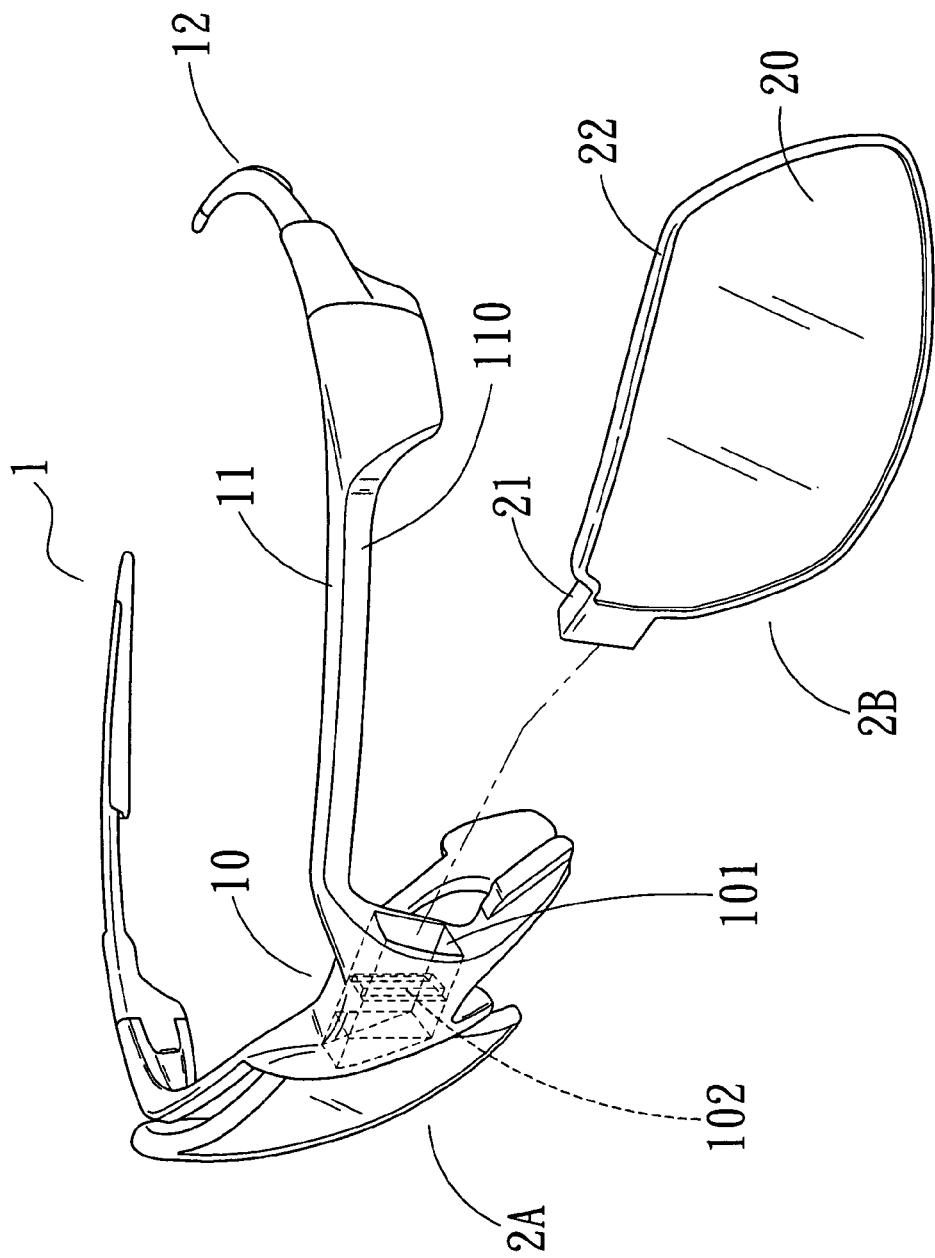
FIG. 5 shows a partially exploded perspective view of eyewear of another embodiment according to the preferred teachings of the present invention.
Figure 6:
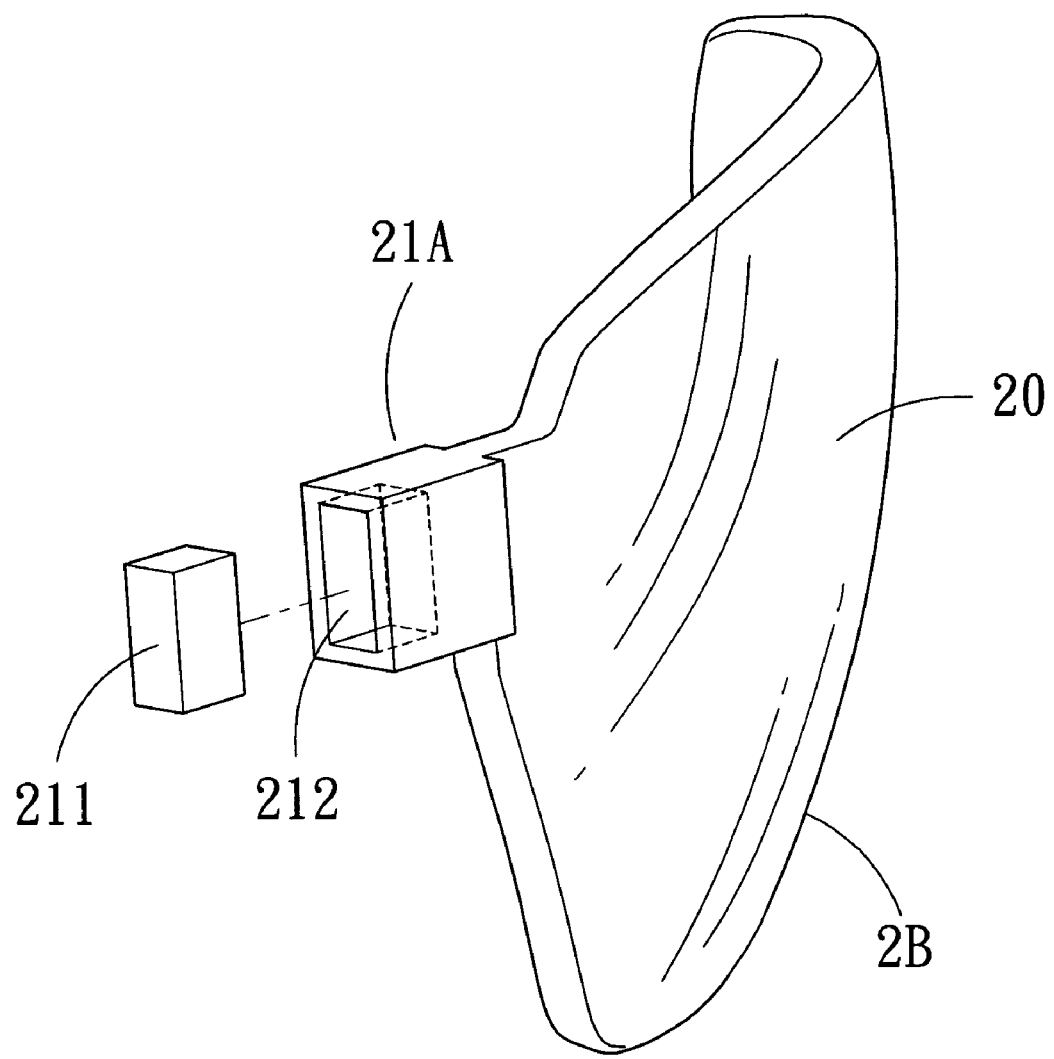
FIG. 6 shows another embodiment of a lens according to the preferred teachings of the present invention.

Each lens portions 2A, 2B includes a lens 20 and a protrusion 21 formed on an inner end of the lens 20. The protrusion 21 can be formed on a body of the lens 20. However, the protrusion 21 can be a separate member fixed to the lens 20. In an example shown in FIG. 6, the protrusion 21A and the lens 20A of each lens portions 2A, 2B are integrally formed as a single continuous monolithic piece. In another example shown in FIG. 5, the lens 20 of each lens portion 2A, 2B includes a ring 22 on a periphery thereof, and the protrusion 21 is formed on the ring 22. A portion of the ring 22 of each lens portion 2A, 2B is coupled with a recessed portion 110 of one of the horizontal rods 11. The protrusion 21 of each lens portions 2A, 2B is received in one of the grooves 101. At least one face of the protrusion 21 of each lens portion 2A, 2B includes a magnetically attracted element 211 that is attracted by the magnetically attracting element 102 in one of the grooves 101. In another example, at least one face of the protrusion 21 of each lens portion 2A, 2B includes a magnetically attracting element that can attract a magnetically attracted element mounted in one of the grooves 101. In a further example, each groove 101 receives a first magnet, and the protrusion 21 of each lens portion 2A, 2B includes a second magnet to provide magnetic attraction between the first and second magnets.

In an example, the protrusion 21 of each lens protrusion 2A, 2B includes a compartment 212 receiving the magnetically attracting or magnetically attracted element 211, with a face of the magnetically attracting or magnetically attracted element 211 exposed outside the compartment 212. Thus, the magnetically attracting or magnetically attracted element 211 can be reliably coupled in the compartment 212.

Figure 4:
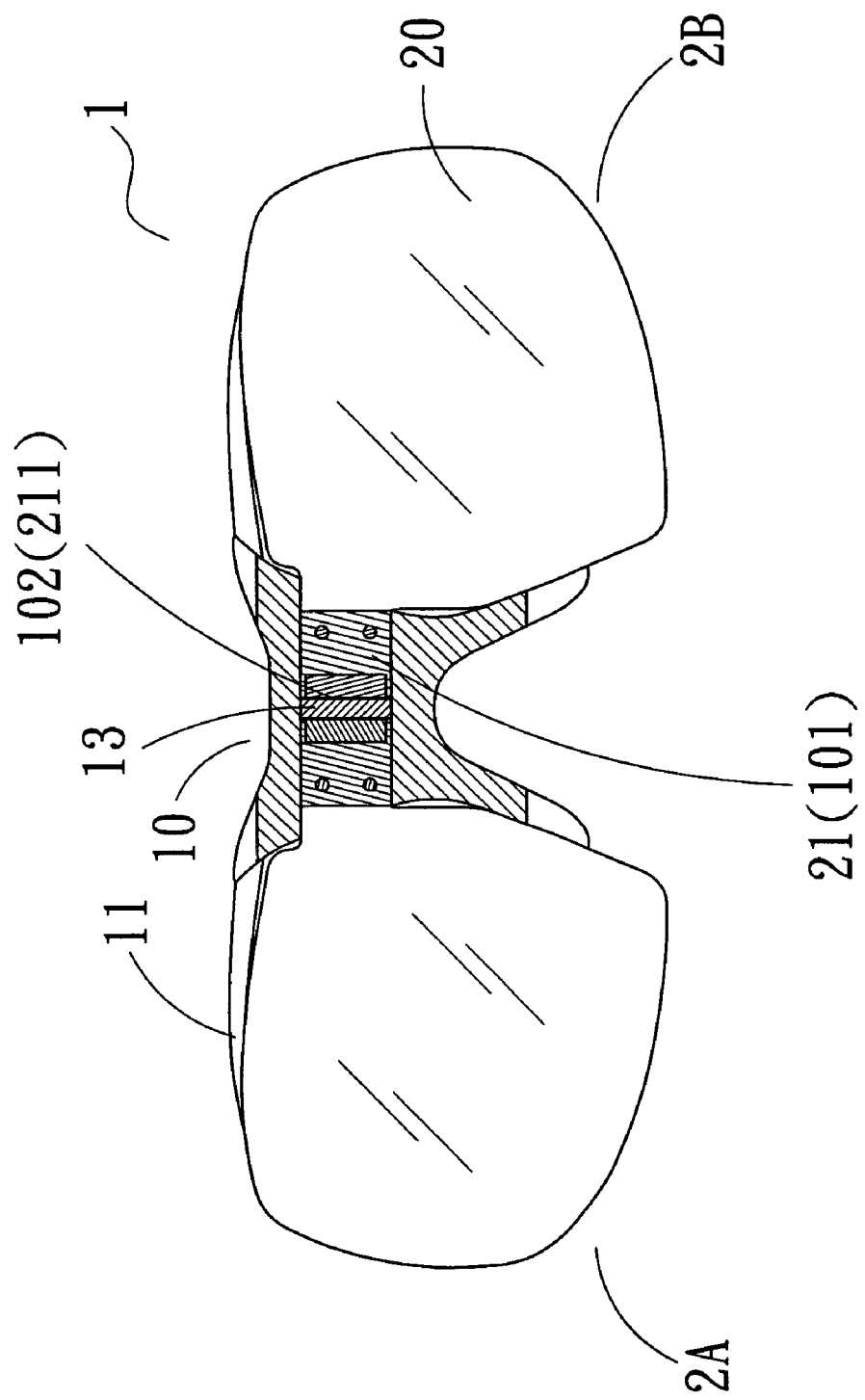
FIG. 4 shows a partially sectioned front view of the eyewear of FIG. 1.

With reference to FIG. 4, although the lens portions 2A and 2B are coupled to the bridge 10 of the frame 1 by magnetic attraction, the coupling effect is reliable by the grooves 101 receiving the protrusions 21. Particularly, the walls of the grooves 101 reliably catch and support the protrusions 21 such that the lens portions 2A and 2B are coupled with the frame 1 at more than one point. A reliable coupling effect is provided by three-dimensional coupling and magnetic attraction between the coupling portions 2A and 2B and the frame 1.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Eyewear comprising:
a frame including a bridge having two outer sides, with each of the two outer sides including a groove extending inward, with the groove of each of the two outer sides having at least one face section that is magnetically attracting or magnetically attracted; and
two lens portions each including a lens and a protrusion formed on an inner end of the lens, with the protrusion of each of the two lens portions being received in the groove of one of the two outer sides, with a magnetically attracted or attracting element being mounted on at least one face of the protrusion of each of the lens portions and having magnetic attraction with said at least one face section of the groove of one of the two outer sides.

2. The eyewear as claimed in claim 1, with the lens of each of the two lens portions including a ring mounted around a periphery thereof, and with the protrusion being formed on the ring.

3. The eyewear as claimed in claim 1, with the protrusion and the lens of each of the two lens portions being a single continuous monolithic piece.

4. The eyewear as claimed in claim 1, with said at least one face section of the groove of each of the two outer sides being formed on an end face of the groove that faces outward.

5. The eyewear as claimed in claim 1, with the protrusion of each of the two lens portions including a compartment, and with the magnetically attracted or attracting element being received in the compartment and having a face exposed outside the protrusion.

* * * * *